United States Patent
Alliger

[15] 3,659,402
[45] May 2, 1972

[54] MULTIPLE SCREEN CONSTRUCTION

[72] Inventor: Howard Alliger, 10 Ponderosa Drive, Melville, N.Y. 11746

[22] Filed: Mar. 30, 1970

[21] Appl. No.: 23,911

[52] U.S. Cl..................................55/233, 55/487, 55/524, 44/525, 210/490, 210/499, 261/100
[51] Int. Cl.............................................B01d 47/06
[58] Field of Search...............55/185, 186, 233, 234, 242, 55/259, 97, 486–489, 498, 524, 525, 514, 387; 261/100–107, 98; 210/489, 490, 499

[56] References Cited

UNITED STATES PATENTS

| | | |
|---|---|---|
| 1,479,270 | 1/1924 | Wolcott.....................................55/233 |
| 1,912,235 | 5/1933 | Winslow....................................55/233 |
| 2,008,800 | 7/1935 | Somers......................................55/491 |
| 3,031,827 | 5/1962 | Onstad......................................210/490 |
| 3,168,917 | 2/1965 | Bartels...................................55/DIG. 31 |
| 3,325,973 | 6/1967 | Illingworth..................................55/90 |
| 3,370,401 | 2/1968 | Lucas et al..................................55/90 |
| 3,372,530 | 3/1968 | Zimmer....................................261/116 |
| 3,563,828 | 2/1971 | Marshall....................................55/514 |

Primary Examiner—Bernard Nozick
Attorney—Kenneth S. Goldfarb

[57] ABSTRACT

A screen network construction for air pollution control apparatus comprising a plurality of screens arranged in abutting relationship. The screens are secured tightly together to prevent clogging and to form countless tortuous paths for water and air to mix.

2 Claims, 4 Drawing Figures

PATENTED MAY 2 1972

3,659,402

INVENTOR.
HOWARD ALLIGER
BY
ATTORNEY

MULTIPLE SCREEN CONSTRUCTION

This invention relates to a multiple screen construction for an air pollution control apparatus and is copending with the application of Howard Alliger, Ser. No. 810,725, filed Mar. 26, 1969, for "Screens for Air Pollution Control."

Various types of gas scrubber and anti-pollution devices have been previously utilized in attempts to reduce air pollution arising from soot and other solid contaminants and noxious matter being disposed in the atmosphere from the combustion of various fuels or waste matter especially for industrial purposes. However, these prior art devices are usually quite complicated and expensive employing various delicate moving parts, swirls, huge amounts of water, packing wheels, filters, louvers, cyclones and other elements which generally require regular cleaning and frequent maintenance. Further, these devices did not serve to completely dispose of the solid contaminants and noxious material, but merely screened part thereof from the atmosphere requiring other apparatus for disposal purposes.

In the aforementioned copending application, Ser. No. 810,725, there is disclosed the use of screens which are positioned across the path of dirty air or gases. Water is delivered through a header on the screens. However, loosely disposed screens have been found to clog and rather than use a header, it has also been found that the gases to be cleaned will mix better if the water is sprayed on the screen network from a location in advance of the screen network.

Water washed screens have been tried as an air pollution abatement device. This particular means for air purifying previously never worked well for the removal of soot or gases and was never used on a commercial basis.

Non water washed packed screens and mesh have been used for many years for the removal of water and other liquid mists. Here, any mist (droplet) in the air stream would impinge on the screening, collect, and when the drops were large enough, fall or stream off into a collector. However, if any particulate matter such as soot and fly ash were in the air flow, this mesh would quickly clog and completely obstruct the air path. Also, water washing did not work with these prior devices.

The prior art and previous experimentation gave rise to the belief that if the screen layers were too close together, without at least a slight separation, the washing water would not feed the whole network and there would be parts or spots left unwetted. Also, it was felt that the pressure drop across the screens would go up to an impractical level, since the air and water path would be greatly restricted.

However, the present invention gave rise to certain unexpected results and new concepts as follows.

1. The closer the screens were packed together, the more efficiently contaminants were removed from the air stream.
2. Where the screens were tightly together, no soot, staining, or dust would collect and stick to the screens.
3. The pressure drop did not go up at all with the screens tightly together.
4. The screen network wet out far better when the screens were as tight as possible, that is, touching at all possible points.

It is now apparent according to the present invention that the closest screen combinations give the best results. A number of screen layers can be stapled together, finally ending up with a screen combination with a staple approximately every square inch. After putting these stapled screens in the dirty (oily soot) air stream for many hours, it was noticed that the region not near a staple was filling in with soot. And moreover, the water flow at these non-stapled regions instead of being smooth was pulling and blowing off in an erratic fashion impairing the apparent "solid" water front.

Now even the slightest separation of screens is considered an imperfection in accordance with the present invention, and the best results are had if the screens are epoxied or welded together over the entire surface. The slight separation in the commercially available packed meshes or demisters was the reason these meshes were not suitable with water washing.

It is further in accordance with the present invention to provide a forced path with quick, up, down, and around motion, all the time being wetted out with water flowing perpendicular to the path. This long, sinewy, quick changing watery path is different from any other scrubbing device. And with very little energy or pressure drop the efficiency of air purifying is remarkable. For example, a 28 screen network, air flow 50 feet per minute, 2.5 inches water pressure drop, close to 100 percent of 0.2 micron (fuming titanium tetrachloride) will be removed. At a flow of 11 gallons per minute, water without additives, 1,000 parts per million $SO_2$ will be reduced to approximately one part per million. This efficiency falls off rapidly if there is any separation in the screens.

Another interesting and useful observation is that better results are obtained when the screens are wetted by a fine spray (60 PSI nozzle or better) upstream than if they are washed (as was done in the past) by a header washing them from above. It would seem in the former case that the air and the water enter the holes or mesh together, and all materials are better and more quickly wetted. The air flow pulls the water thru the network and the wetting is as complete as the top header.

It is, therefore, the primary object of this invention to provide a multiple screen construction for air pollution control devices of the type similar to that described hereinabove, which multiple screen construction will provide for excellent pollution removal by providing countless tortuous paths for water and air to mix while the screens will not clog, no matter how concentrated the grain loading.

Another object of the invention is to provide a multiple screen construction for an air pollution control apparatus which employs a means for cleansing contaminated gases which is very efficient because of the elimination of clogging of the screens by tightly securing the screens together. The screens may be coated with an epoxy adhesive for adhesively securing the screens together and the screens may be compressively bound tightly together.

In the present invention, a screen network comprising several tightly bound screens which in one embodiment may decrease in mesh sizes in the direction of movement of the gases to be cleaned. Water is directed onto the screens from a position in advance of the screen network so that the water is sprayed on and between the screen surfaces substantially filling the entire network as a continuous sheet with no voids. As the dirty gases impinge upon the screen network, the dirty gases are thoroughly mixed with the water in the countless paths thus formed. All contaminant particles become completely wetted and the water carrying the trapped pollutants may then be disposed of while the clean air continues through the screen network and out of the apparatus. The larger mesh screens in the network aid in eliminating large soot particles, so that by the time the gas reaches the finer mesh screens, their smaller openings cannot be clogged. Furthermore, the flow of the water from a location in advance of the screen network causes the water and gases to enter the screen network together and thus mix better while preventing clogging of the larger mesh screens as well.

A further object of the invention resides in the provision of a novel screen network employing an epoxy coating for the screens which not only secured the screens to each other, but provides for a preservative coating for the screens for preventing deterioration thereof.

These, together with the various ancillary objects and features, which will become apparent as the following description proceeds, are attained by this novel cleansing assembly for contaminated fluids, a preferred embodiment of which is shown in the accompanying drawing, by way of example only, wherein.

Figure 1:
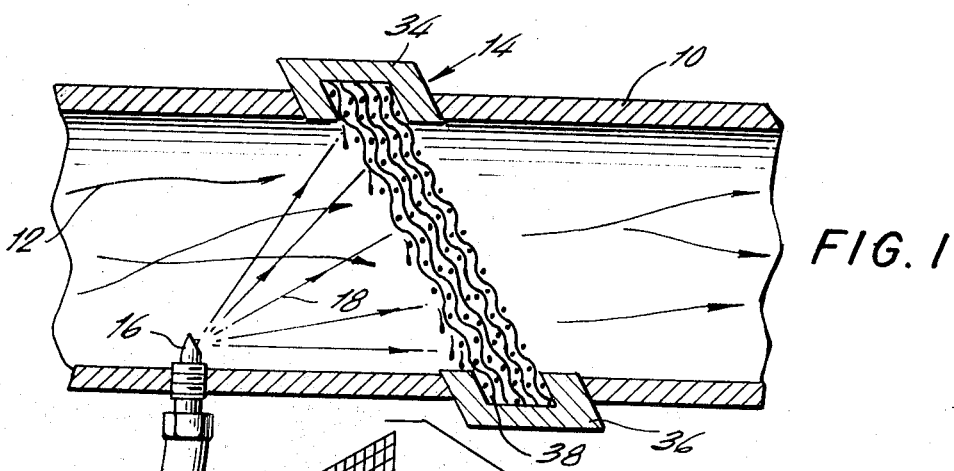
FIG. 1 is a longitudinal sectional view illustrating the multiple screen construction for an air pollution control apparatus in accordance with the concepts of the present invention.
Figure 2:
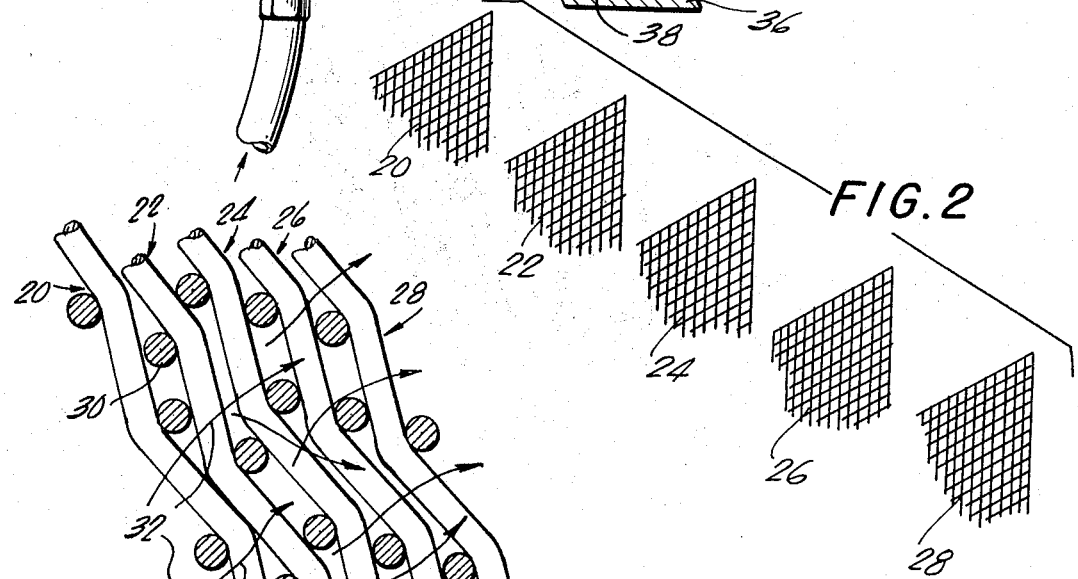
FIG. 2 is an exploded perspective view illustrating portions of the screens utilized in the present invention.
Figure 3:
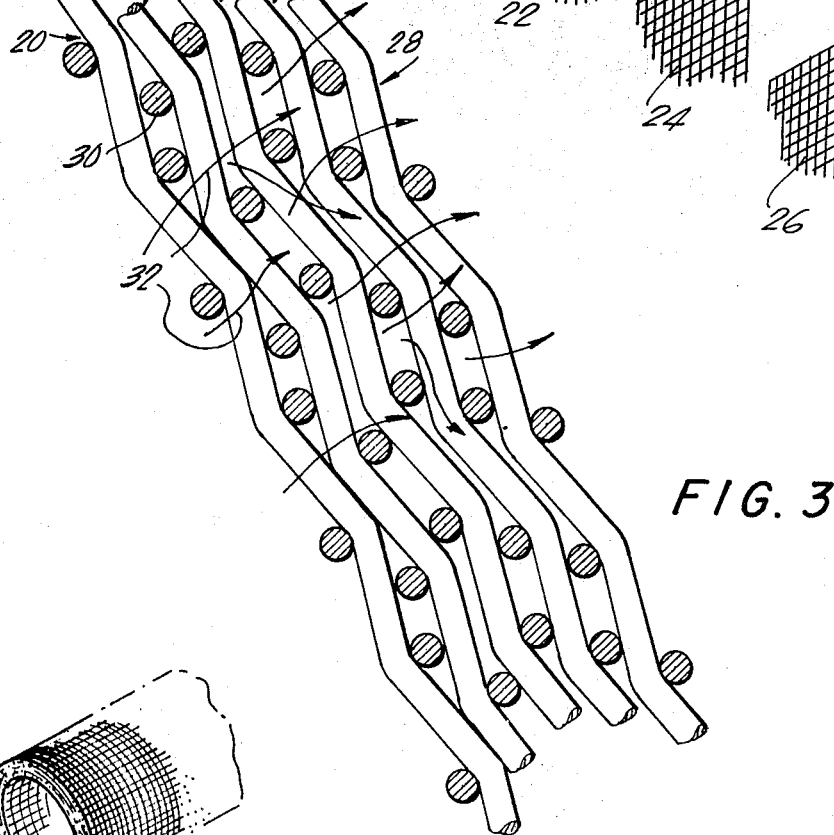
FIG 3 is an enlarged sectional detail view illustrating the manner in which the screens are secured to each other, and, FIG. 4 is a partial perspective view of a modified form of the invention.

With continuing reference to the accompanying drawing, wherein like reference numerals designate similar parts throughout the various views, reference numeral 10 generally designates a conduit into which gases, indicated by arrows 12, are fed for cleaning in the forward part of the conduit 10. A screen network generally indicated by reference numeral 14 is mounted in the conduit 10 and employs the multiple screening construction in accordance with the concepts of the present invention. Disposed in the conduit 10 in advance of the screen network 14 is a water spray assembly 16. This water spray assembly is upstream of the screen network 14 and supplies a fine spray in the direction of arrows 18 at an angle to the screen network so that the water from the spray assembly 16 and the dirty gases passing in the direction of the arrows 12 enter the screen openings together and mix and wet out in an optimum manner. It has been found that pressures from 60 PSI upwardly form a satisfactory spraying pressure, and 160 PSI has been found to be a good practical pressure to provide for a finely divided spray. Cold water is preferably employed at a temperature preferably ranging from 50° to 80° F. and may be recirculated through a heat exchanger and cooled in river or waste water or the like if it becomes heated because of the temperature of the gases.

The screen network 14 comprises a plurality of screens of any suitable number, such as five, six, or upwardly in numbers thereof. As shown, five screens 20, 22, 24, 26, and 28 may be provided and are formed of any suitable material, such as a copper alloy as is usually employed for screens or the like. Each of the metallic screens 20, 22, 24, 26 and 28 are provided with a coating of an epoxy or like synthetic plastic adhesive which provides for a non-corrosive protection and coating for the screens. Thus, the contaminants in the gases being cleaned which may form highly corrosive acids will not cause deterioration of the screens because of relatively inert material used to provide a protective coating therefor.

One of the unusual advantages of the invention is that the epoxy coatings on the individual screens will bond with each other because the screens are assembled with the epoxy coating still wet and during the drying the epoxy coating as shown at 30 will bond the screens to each other to form myriad paths through which the mixed air and water will pass, as indicated by arrows 32. The mesh size of the screens 20, 22, 24, 26, and 28 may be the same or may be graded in mesh size which decrease in mesh size from approximately window screen mesh size of the screen 20 to a considerably smaller size of the screen 28.

The screens may be held in place by channels 34 and 36 or by any suitable means and fasteners such as staples 38 may be used to fasten the individual screens together with the staple compressing the screens and tightly binding the screens together. The screens may be compressed together so that the entire assembly is continuously under compression.

It is an important consideration that the screen network 14 will not clog no matter how concentrated the grain loading is, because there are myriad combinations of paths, and the continuous spray on the surface of the screen will force the admixture of the contaminants with the water to the extent that all of the material will be forced through the screens.

Figure 4:
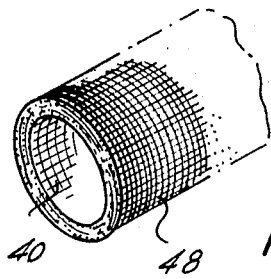

Referring now to FIG. 4, there is shown an arrangement of the screens in a tubular shape. The outer screen 48 is bonded to the successive inner screens including the innermost screen 40. The screens are concentrically disposed to form a tubular assembly.

If it is desired, a suppressor screen located downstream or downwardly or rearwardly of the screen network 14 may be used to aid in the gathering of the admixed water and contaminants. Further, it is within the concepts of the invention to add any suitable oil or emulsion to the water as it is being sprayed on the screen assembly.

A latitude of modification, substitution and change is intended in the foregoing disclosure, and in some instances some features of the invention may be employed without a corresponding use of other features.

I claim:

1. An air pollution control apparatus for cleaning gas and removing contaminants therefrom comprising a conduit open at a forward end for the gas to be cleaned, a screen network, including a plurality of superposed planar wire mesh metallic screens disposed and supported in said conduit and extending angularly rearwardly downwardly and transverse to the conduit, and liquid spray means disposed in said conduit forwardly of said screen network for continuously spraying said screen network, and means tightly securing adjacent of said screens to each other under compression, and an epoxy coating covering each screen preventing corrosion and adhesively bonding said screens together.

2. An air pollution control apparatus according to claim 1, wherein each of said screens have a smaller mesh size than the screen immediately before it in the direction of movement of said gas being cleaned and being closely spaced to each screen immediately adjacent thereto, said securing means further including staples holding said screens together under compression.

* * * * *